united States Patent [19]
Hill

[11] Patent Number: 5,461,935
[45] Date of Patent: Oct. 31, 1995

[54] SLIP CLUTCH LINEAR ACTUATOR

[75] Inventor: Jason J. Hill, Manchester, Mo.

[73] Assignee: Emerson Electric Co., St. Louis, Mo.

[21] Appl. No.: 167,696

[22] Filed: Jan. 18, 1994

[51] Int. Cl.⁶ ................................................... F16H 57/10
[52] U.S. Cl. .................... 74/424.8 R; 74/89.15; 192/141
[58] Field of Search ............................ 74/424.8 R, 89.15; 192/141

[56] References Cited

U.S. PATENT DOCUMENTS

| | | |
|---|---|---|
| 3,583,248 | 6/1971 | Langenberg . |
| 3,736,802 | 6/1973 | Kibler . |
| 4,574,654 | 3/1986 | Griffiths . |
| 4,588,913 | 5/1986 | Adami . |
| 4,672,858 | 6/1987 | Langowski . |
| 4,846,011 | 7/1989 | Gaffney ........................ 74/424.8 R |
| 4,858,481 | 8/1989 | Abraham ........................ 74/89.15 |
| 5,063,808 | 11/1991 | Hill . |
| 5,136,889 | 8/1992 | Hill et al. . |
| 5,187,993 | 2/1993 | Nicholson et al. . |

Primary Examiner—Charles A. Marmor
Assistant Examiner—David Fenstermacher
Attorney, Agent, or Firm—Polster, Lieder, Woodruff & Lucchesi

[57] ABSTRACT

A linear actuator of the present invention includes a hollow drive tube. A slip clutch having front and rear camming surfaces is housed in the tube for rotation about an longitudinal axis. The slip clutch is axially fixed in the tube by a shoe. The slip clutch threadably receives a threaded shaft which is connected to a gear motor to be driven thereby. The shaft has stop nuts at either end, each of which has a camming surface which mates with a respective camming surface of the slip clutch. When the shaft is rotated by the motor, it rotates in the slip clutch. The slip clutch frictionally engages the drive tube, via the shoe, so that the tube will move linearly. When the slip clutch is engaged by one of the stop nuts, the slip clutch will free wheel in the tube and the tube will cease its linear movement. The slip clutch will continue to rotate in the tube till the motor is stopped or its direction is reversed.

21 Claims, 4 Drawing Sheets

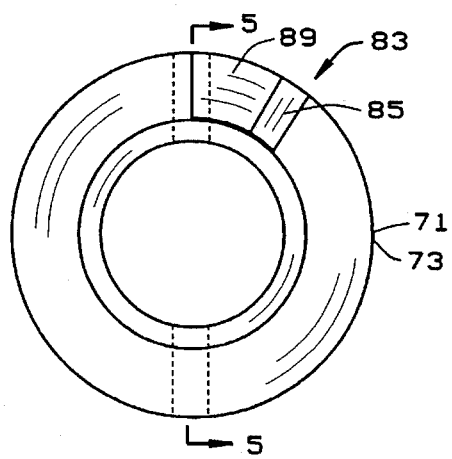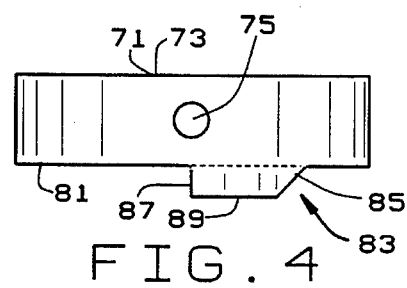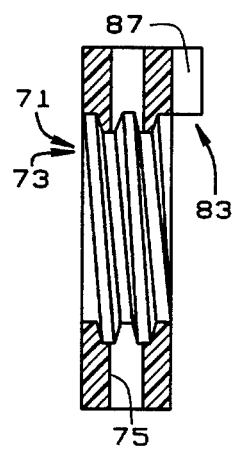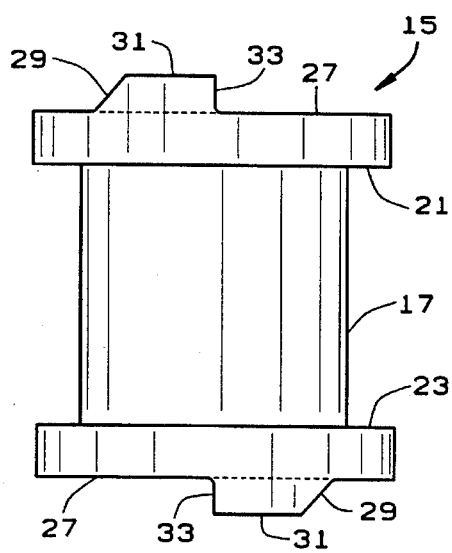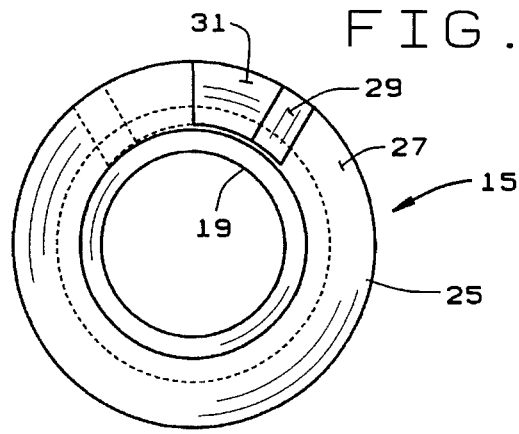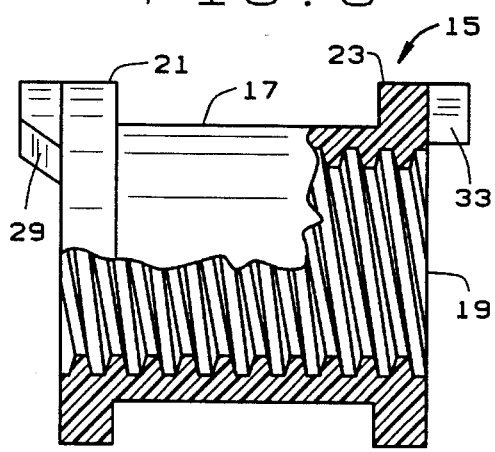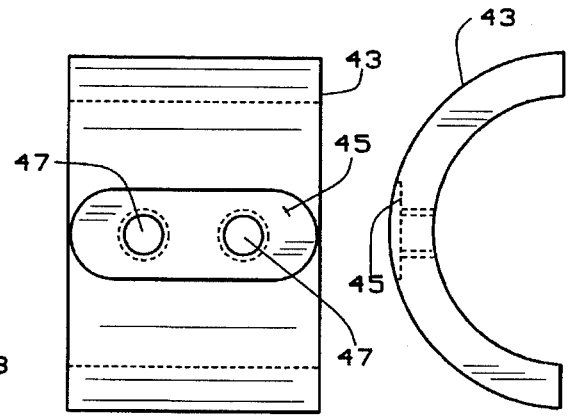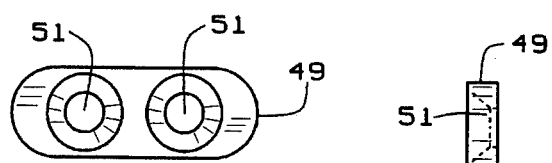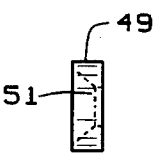

SLIP CLUTCH LINEAR ACTUATOR

BACKGROUND OF THE INVENTION

This invention relates to linear actuators, and in particular, to a linear actuator having a slip clutch structure arrangement which eliminates the need for electro/mechanical limit switches. While the invention is described in particular detail with respect to linear actuators, those skilled in the art will recognize the wider applicability of the described invention.

Linear actuators are well known in the art. They are typically connected to gear motors to convert the rotational output of the gear motor into linear motion to move an object linearly. Linear actuators find use in devices such as hospital beds to raise and lower the head and foot of the bed, in chairs, to raise and lower the chair, and a number of other similar and dissimilar devices.

Linear actuators typically include a tube to which the device is connected and a shaft which is threadably received in the tube. This shaft is operatively connected to the motor so as to be rotatively driven thereby. As the motor rotates the shaft, the tube moves forward or backward on the shaft, depending on the direction of rotation of the motor. The actuator assembly usually includes limit switches which limit the number of rotations the motor or the distance of travel this tube may make in any one direction. When the limit is reached, the limit switch cuts off power to the motor preventing further movement of the tube. The motor can then only operate in the opposite direction.

The limit switch is generally part of an assembly which includes a plurality of gears to reduce the speed of the output so that the limit switch will properly control the number of rotations. Such an assembly is shown, for example, in U.S. Pat. No. 5,063,808, assigned to the assignee of the present invention and incorporated herein by reference. For the control to work properly, the gears must be properly aligned with each other, and the ratio between the gears must be properly determined. If the gears are not properly aligned, or the gear ratios are not properly determined, the timing of the limit switch will be off and the limit switch will turn off the motor too early or too late, causing the linear actuator to extend too far or not far enough. Because of the precision required for the gearing, the limit switch assemblies can be relatively complex, and hence expensive to produce.

SUMMARY OF THE INVENTION

One object of the present invention is to provide a linear actuator in which the operation of the actuator can be easily controlled.

Another object is to provide such an actuator which does not incorporate limit switches.

Another object is to provide such an actuator which is simple to manufacture and inexpensive to produce.

Another object is to provide such an actuator which does not rely on a high degree of precision for proper operation.

These and other objects will become apparent to those skilled in the art in light of the following disclosure and accompanying drawings.

According to the invention, briefly stated, a linear actuator of the present invention includes a hollow drive tube. A slip clutch having front and rear camming surfaces is housed in the tube for rotation about an longitudinal axis. The slip clutch is axially fixed in the tube by a shoe. The shoe, in turn, is positionally fixed in the tube. The slip clutch threadably receives a threaded shaft which is operatively connected to a motor so as to be rotatively driven thereby. The shaft has stop nuts at either end, each of which has a camming surface which mates with a respective camming surface of the slip clutch during desired operation at each directional end of travel. When the shaft is rotated by the motor, it rotates in the slip clutch. The slip clutch is made of a material such that it will frictionally engage the drive tube, via the shoe, so that the tube will move linearly when the clutch is between the two stop nuts and will free wheel in the tube when the clutch is engaged by one of the stop nuts. Preferably, the clutch is made of a lubricous plastic material. When the slip clutch is engaged by one of the stop nuts, the slip clutch will free wheel in the tube and the tube will cease its linear movement. The slip clutch will continue to rotate in the tube till the motor is stopped or its direction is reversed. This construction allows for the actuator to be built without limit switches.

Limit switches are commonly built directly into the motor. Thus, two motor types must be built and stocked—one with limit switches and another without limit switches. Because this actuator does not need limit switches, a single motor type, i.e. one without limit switches, need only be built and stocked. This eliminates the cost of the limit switch assembly and the motor housing therefor, and the cost involved in stocking two types of motors. The use of the linear actuator of the present invention allows a motor without limit switches to be used with a linear actuator as well as with other devices, such as fans, pumps, etc. Further, because limit switches are not needed and are replaced by the slip clutch and stop nuts, the precision required for the limit switches is eliminated and the length of travel of the drive tube is governed by the placement of the stop nuts on the shaft. A change in the length of travel of the drive tube can be made simply by selectively changing the spacing between the stop nuts.

BRIEF DESCRIPTION OF THE DRAWINGS

FIG. 3 is an end view of a stop nut of the actuator;

FIG. 4 is a side elevational view of the stop nut;

FIG. 5 is a cross-sectional view of the stop nut;

FIG. 6 is plan view of a slip clutch of the actuator;

FIG. 7 is an end elevational view of the slip clutch;

FIG. 8 is a plan view of the slip clutch, partly in cross-section;

FIG. 9 is a top plan view of a shoe of the actuator;

FIG. 10 is a side elevational view of the shoe;

FIG. 11 is a top plan view of a shoe positioner of the actuator;

FIG. 12 is a side plan view of the positioner;

DESCRIPTION OF THE PREFERRED EMBODIMENT

Figure 1:
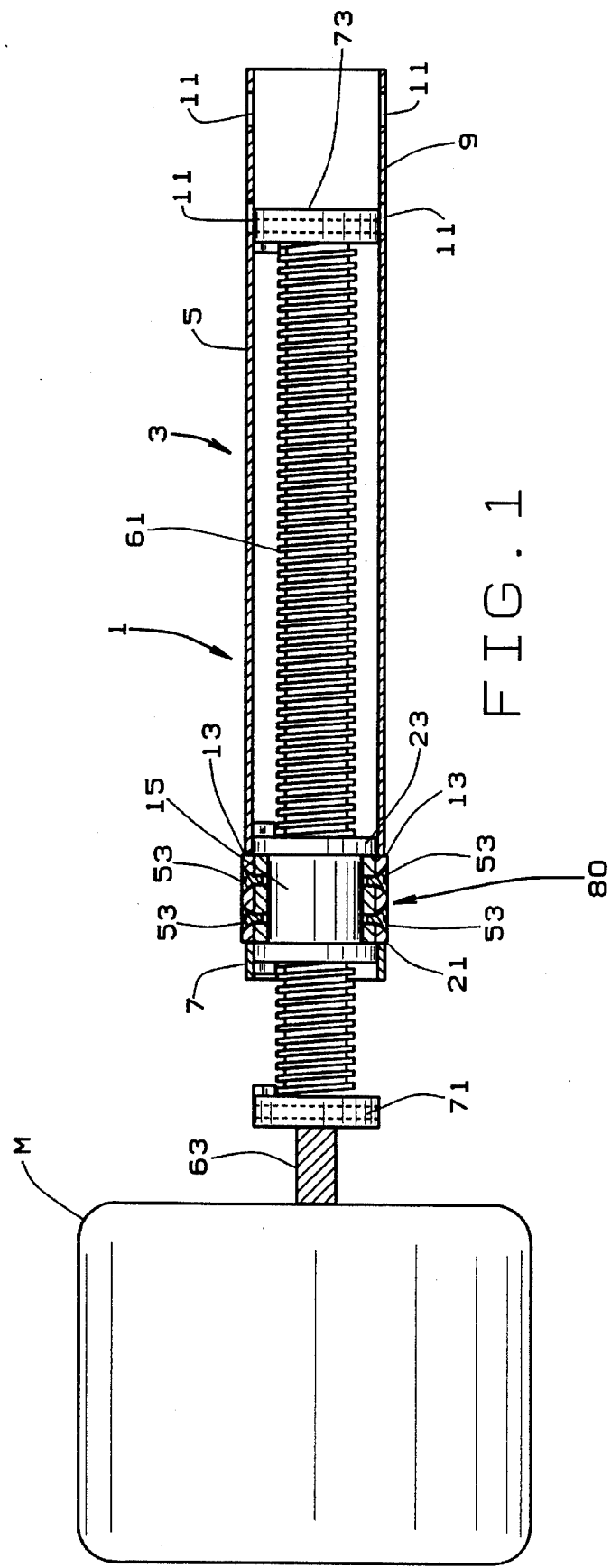
FIG. 1 is a cross-sectional view of one illustrative embodiment of linear actuator of the present invention connected to a drive motor.
Figure 2:
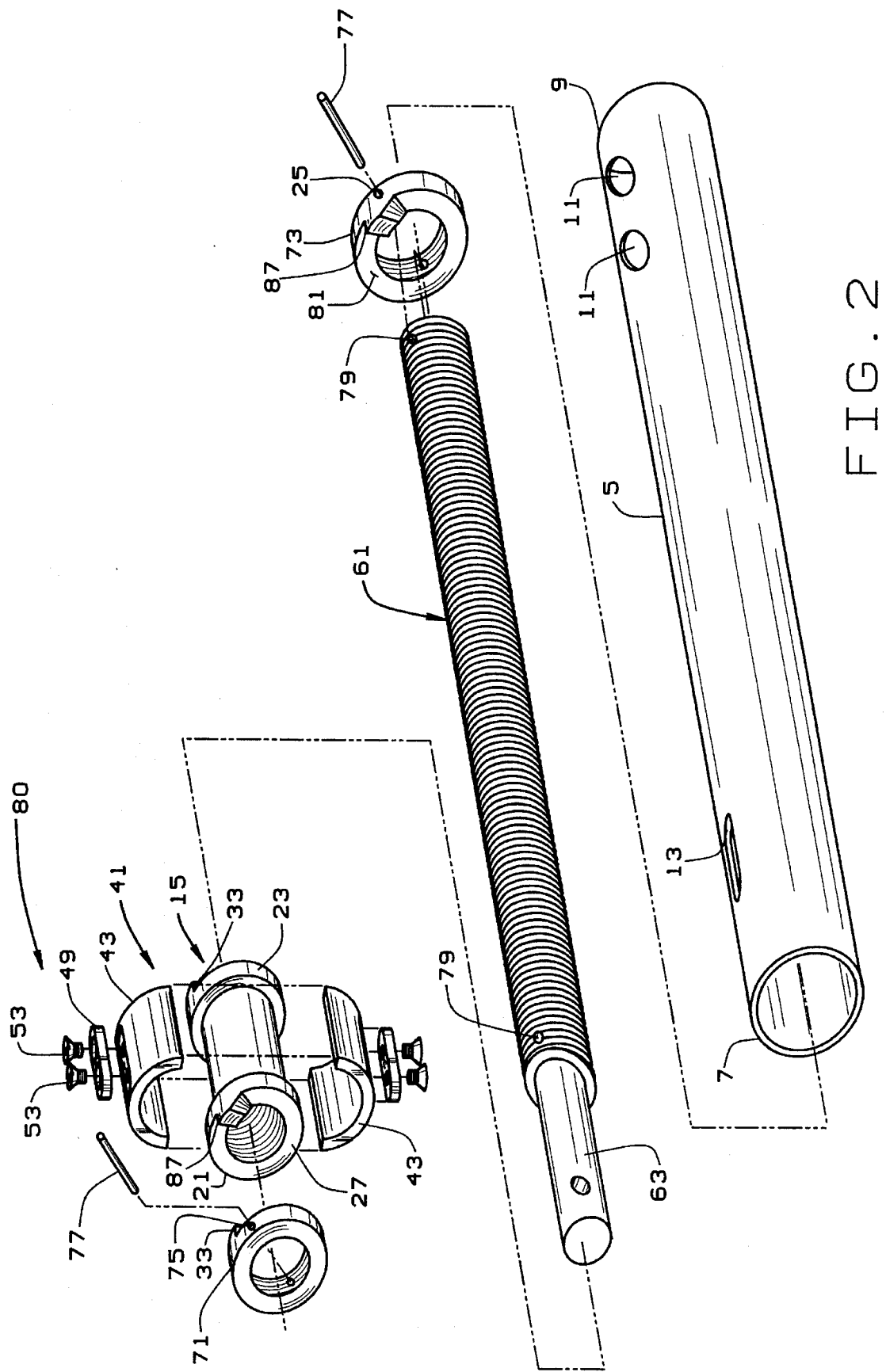
FIG. 2 is an exploded view of the actuator.

A linear actuator 1 of the present invention is shown in FIG. 1 connected to a motor M so as to be operated thereby. In the preferred embodiment, motor M is a conventional gear motor, although other motor construction types are compatible with my invention. Actuator 1 includes a body 3 defining an open ended tube 5 having a forward or first end 7 and a back or second end 9. The second end 9 of tube 5 defines two pair of axially aligned openings 11 which allow for connection of the actuator 1 to a device, such as a hospital bed or chair, for example. The respective pair of openings are separated by 180° and are radially aligned. A pair of elongate, generally oval openings 13 also are formed near the first end 7. Openings 13 are axially aligned with openings 11.

A clutch assembly 80 is received in tube 5 near first end 7 for rotation about its longitudinal axis in the tube. As is described below, clutch assembly 80 is axially fixed in tube 5. Clutch assembly 80 is shown in more detail in FIGS. 6–8. Clutch assembly 80 includes clutch 15 defined by a generally cylindrical body 17 having a threaded through-bore 19 formed in it. A first flange 21 and a second flange 23 extend radially outwardly from opposite ends of body 17. Each flange defines a face 25 having a camming surface 27. The two faces are identical and include a sloped ramp 29 extending up to a plateau 31. Plateau 31 ends in a step, as at 33, which defines a stop, as explained below.

Clutch assembly 80 and clutch 15 are axially fixed in tube 5 by a two-piece shoe 41. (FIGS. 9–12) Shoe 41 includes identical top and bottom pieces 43. Shoe pieces 43 are arcuate in shape and together define a cylinder sized to receive a portion of clutch 15. Pieces 43 of shoe 41 are positioned between flanges 21 and 23 of clutch 15 and each has an inner diameter sized so that clutch 15 may rotate within the cylinder they define if the frictional forces between them are overcome. Flanges 21 and 23 form stops which prevent clutch 15 and shoe 41 from moving axially relative to each other. The outer diameter of shoe 41 is sized so that it may be slidably received in tube 5. A slight depression 45 is formed in the top of each piece 43. Depressions 45 are shaped complementary to tube opening 13 and are aligned therewith. A pair of screw holes 47 are formed in depression 45.

A positioning member 49 is received in tube opening 13 and depression 45. Member 49 is shaped complementary to opening 13 and depression 45 and sized such that it is substantially flush with the tube's outer surface when placed in shoe depression 45. Member 49 has a pair of screw holes 51 which receive screws 53. Screws 53 extend through screw holes 51 into screw holes 47 of shoe 41 to connect member 49 to shoe pieces 43. Screw holes 51 preferably have beveled surfaces so that the screws 53 may be recessed in member 49. The sizing of member 49 and the sinking of screws 53 provide a substantially flush outer surface to actuator 1. Members 49 are restrained by the edges of opening 13 and serve to fix shoe members 43 in place in tube 5, thus axially positioning clutch assembly 80 with respect to tube 5.

A threaded shaft 61 is threadably received in the bore 19 formed in clutch 15. Shaft 61 has a forward portion 63 which allows the connection of the shaft 61 to motor M in any conventional manner. A threaded interconnection works well, for example. As can be appreciated, when shaft 61 is rotated by motor M, it rotates within clutch assembly 80. The threads of clutch 15 interact with the threads of shaft 61, causing the tube 5 to move linearly, in a forward or rearward direction, depending on the direction of rotation of the motor.

To prevent the continued movement of clutch assembly 80 and shaft 61, a forward 71 stop and rearward 73 stop are provided. Stops 71 and 73 (FIGS. 3–5) are identical. Each defines a radial bore 75 which is sized to receive a pin 77. The stops are threaded onto shaft 61 until bores 75 are aligned with bores 79 of shaft 61. Shaft 61 has one bore 79 formed near the forward end of the threaded portion of shaft 61 and another bore formed near the opposite end of the threaded portion. Pins 77 extend through the respective bores 75 and 79 to fix the stops 71 and 73 to shaft 61. As can be appreciated, stops 71 and 73 define forward and rearward limits for the travel of tube 5 when shaft 61 is rotated by motor M.

Each stop defines an axially inward directed camming surface 81. Surface 81 has cam ear 83 having a sloped surface 85 and a step 87 separated by a plateau 89. When the shaft 61 is rotated by motor M, stops 71 and 73 rotate with shaft 61. Cam ears 83 are shaped such that when the clutch assembly approaches one of the stops 71 or 73, clutch step 33 of clutch 15 engages stop step 87. The engagement overcomes the force between the tube 5 and the clutch 15, causing the clutch 15 to free wheel within the tube 5, thereby preventing further linear movement of the tube 5.

The clutch 15 and shoe pieces 43 are made of materials having different coefficients of friction. The coefficients of friction are chosen such that the shaft 61 can rotate in clutch 17 while not overcoming the frictional engagement of the clutch 5/shoe pieces 43/tube 5 engagement. The clutch 15 will thus frictionally engage shoe parts 43, will not rotate relative to the shoe parts, and the shoe will drive the tube 5 linearly. The coefficient of friction of the clutch 15 is sufficient to maintain the clutch 15 rotationally fixed with respect to the shoe pieces 43 and the tube 5 when the clutch 15 is not engaging the stops, but the clutch 15 freely rotates with respect to the shoe pieces 43 and tube 5 when one of the stops is engaged. Shoe pieces 43 preferably are made from a hard metal, such as zinc; clutch 15 is preferably made from a lubricous plastic material such as CELCON M90, a polyacetal available from Celanese Plastics & Specialties Co.; and shaft 61 is preferably made from a metal.

Figure 13:
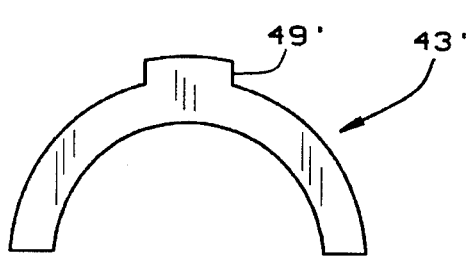
FIG. 13 is a front elevational view of a second illustrative embodiment of the shoe employed with the actuator of this invention.
Figure 14:
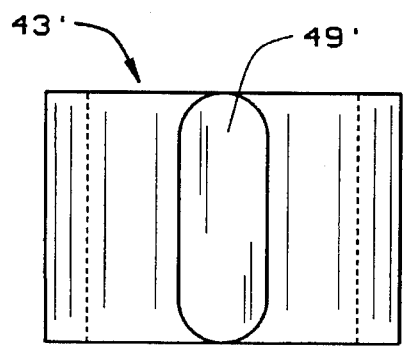
FIG. 14 is a top plan view of the shoe of FIG. 13.
Figure 15:
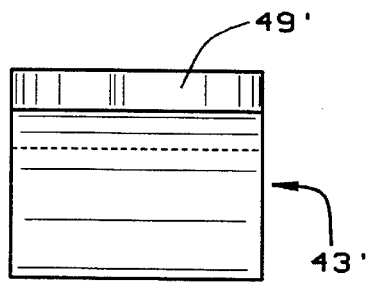
FIG. 15 is a side elevational view of the shoe of FIG. 13.
Figure 16:
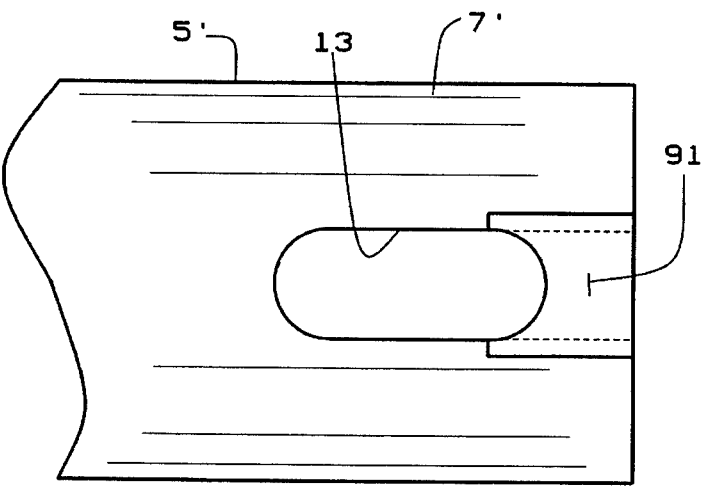
FIG. 16 is a partial top plan view of a tube for use with the shoe of FIG. 13.
Figure 17:
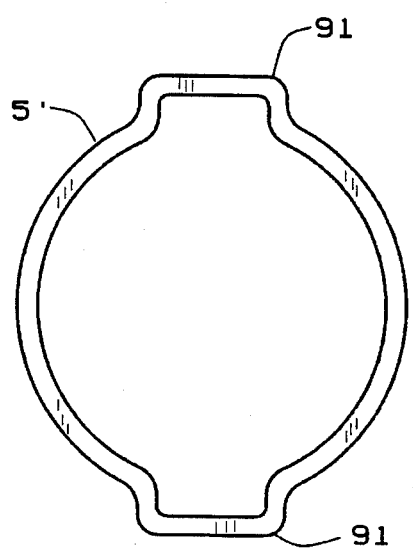
FIG. 17 is a front elevational view of the tube.
Figure 18:
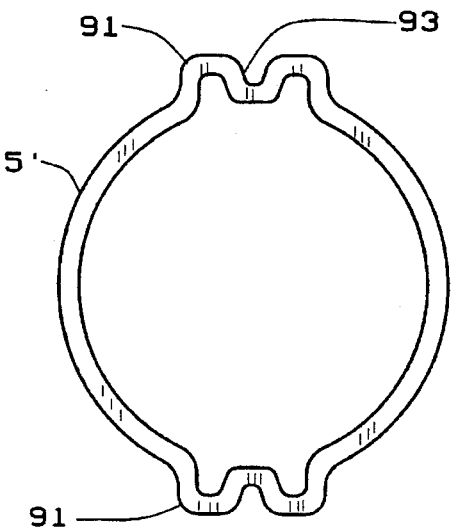
FIG. 18 is a front elevational view of the tube crimped to hold the shoe in the tube.

Turning to FIGS. 13–15, a second embodiment of the shoe is shown. Shoe 43' is substantially similar to shoe 43. However, this shoe is integral with the positioning member and has a projection 49' which positionally fixes the shoe in tube 5. The use of shoe 43' requires a modification to tube 5. Tube 5', shown in FIGS. 16–18 is substantially cylindrical, except at its forward end 7'. Tube 5' has ears or boxes 91 which extend radially from tube 5' between opening 13 and the forward edge of the tube. Ears 91 are sized to receive positioning projections 49'. To hold the shoe in place, the ears are crimped, as at 93 (FIG. 18). The crimp extends rearwardly to the forward edge of the hole 13 to form a stop to prevent forward motion of the shoe 43'. The rear and side edges of the projection 49 interact with the edges of tube hole 13 to prevent rearward and radial movement of shoe 41. This embodiment thus does not require the screws 53.

As can be appreciated, the linear actuator of the present invention eliminates totally the need for limit switches. When the end of the threaded portion of the shaft and the stop is reached, the clutch will simply spin inside of the shoe and tube and the tube will stop moving. The motor will not be subject to extra stresses which may tend to burn it out. The motor will continue to run in this manner until the operator turns it off, or changes the direction of the motor.

Numerous variations, within the scope of the appended claims, may be apparent to those skilled in the art. For example, the shaft may include a plurality of bores 79 extending along its length. This would allow the position of stops 71 and 73, and hence length of linear movement of the tube, to be selectively altered. It would also reduce the inventory of bars necessary to service a broad range of products. The stops 71 and 73 can be secured in place using other means—e.g. lock nuts. As indicated, various forms of drive motors may be employed. Likewise, while certain materials were described as preferred, other materials may be used if desired. These examples are merely illustrative.

I claim:

1. A linear actuator comprising
    a hollow drive tube;
    a two-piece shoe, each piece of said shoe being semicylindrical and having a substantially uninterrupted inner surface, said two-piece shoe being positionally fixed within said hollow drive tube;
    a slip clutch received in said two-piece shoe for rotation about an longitudinal axis, said two-piece shoe positionally fixing said slip clutch axially with respect to said robe, said slip clutch being internally threaded and having a first outboard face and a second outboard face, each said outboard face having a camming surface, said slip clutch having a substantially uninterrupted outer surface frictionally engaged with said inner surface of said two-piece shoe;
    a threaded shaft threadably received in said slip clutch, such that said drive tube will be moved axially relative to said shaft as said shaft is rotated; and
    first and second stop nuts, each said stop nut having a camming surface and being fixed to said shaft to rotate therewith, said first stop nut being fixed to one end of said shaft on a first side of said slip clutch and said second stop nut being fixed to an end of said shaft opposite of said first stop nut on a second side of said slip clutch, said stop nuts being mounted to said shaft such that their respective camming surfaces face the camming surfaces of said slip clutch, the distance between said stop nuts defining the length of a path of travel of said shaft in said tube;
    said slip clutch being made of a material such that it can freely rotate in said two-piece shoe when said slip clutch is engaged with a respective one of said stop nuts and frictionally engage said two-piece shoe when said slip clutch is between said stop nuts such that said slip clutch will remain rotationally fixed with respect to said two-piece shoe so that said tube is moved linearly along said path when said threaded shaft is rotated.

2. The linear actuator of claim 1 wherein said slip clutch is made from a lubricous plastic material.

3. The linear actuator of claim 2 wherein said slip clutch is made from a polyacetal.

4. The linear actuator of claim 1 wherein said slip clutch has radially extending flanges located at opposite ends thereof; said two-piece shoe co-acting with said slip clutch flanges to axially positionally fix said slip clutch in said tube.

5. The linear actuator of claim 4 including a projection extending radially from said shoe; said tube defining an opening which receives said projection, said projection being formed complimentary to said tube opening, said projection coacting with edges of said tube opening to positionally fix said shoe.

6. The linear actuator of claim 5 wherein said projection is formed integrally with said shoe.

7. A linear actuator comprising
    a hollow drive tube;
    a slip clutch housed in said tube for rotation about a longitudinal axis, said slip clutch being positionally fixed with respect to said tube, said slip clutch being internally threaded and having a first face and a second face, each said face having a camming surface, and radially extending flanges located at opposite ends of said slip clutch;
    a shoe positioned on said slip clutch between said flanges, said shoe being positionally fixed in said drive tube, said shoe co-acting with said slip clutch flanges to position said slip clutch axially in said tube; said shoe including a radially extending projection; said tube defining an opening which receives said projection, said projection coacting with edges of said tube opening to positionally fix said shoe; said projection being formed integrally with said shoe; said tube defining a box forwardly of said opening and communicating with said opening to allow passage of said shoe through said tube to said opening;
    a threaded shaft threadably received in said slip clutch, such that said drive tube will be moved axially relative to said shaft as said shaft is rotated; and
    first and second stop nuts, each said stop nut having a camming surface and being fixed to said shaft to rotate therewith, said first stop nut being fixed to one end of said shaft on a first side of said slip clutch and said second stop nut being fixed to an end of said shaft opposite of said first stop nut on a second side of said slip clutch, said stop nuts being mounted to said shaft such that their respective camming surfaces face the camming surfaces of said slip clutch, the distance between said stop nuts defining the length of a path of travel of said shaft in said tube;
    said slip clutch being made of a material such that it can freely rotate in said tube when said slip clutch is engaged with a respective one of said stop nuts and frictionally engage said tube when said slip nut is between said stop nuts so that said tube is moved linearly along said path.

8. The linear actuator of claim 7 wherein said box is crimped to axially fix said shoe in said tube.

9. The linear actuator of claim 5 wherein said projection is separate from said shoe, said shoe defining at least one screw hole, said projection being received in said opening to be secured to said shoe.

10. The linear actuator of claim 9 wherein said shoe defines a depression shaped complementary to said projection, said projection being received in said shoe depression.

11. The linear actuator of claim 5 wherein said projection is flush with an outer surface of said actuator.

12. A linear actuator including
    a hollow drive tube;
    a slip clutch received within said tube for rotation about an longitudinal axis, said slip clutch having a generally cylindrical body and a first flange extending radially from one end of said body and a second flange extending radially from a second end of said body, said body having a generally uninterrupted outer surface between said first and second flanges, said slip clutch being internally threaded and having a first face and a second face, each said face having a camming surface;

a shoe substantially surrounding said slip clutch between said flanges, said shoe being positionally fixed in said drive tube to axially fix said slip clutch with respect to said tube;

a threaded shaft threadably received in said slip clutch, such that said drive tube will be moved axially relative to said shaft as said shaft is rotated; and first and second stop nuts, each said stop nut having a camming surface and being fixed to said shaft to rotate therewith, said first stop nut being fixed to one end of said shaft on a first side of said slip clutch and said second stop nut being fixed to an end of said shaft opposite of said first stop nut on a second side of said slip clutch, said stop nuts being mounted to said shaft such that their respective camming surfaces face the camming surfaces of said slip clutch, the distance between said stop nuts defining the length of the path of travel of said shaft in said tube, said slip clutch rotating with said shaft when a selected stop nut's camming surface contacts its respective camming surface of said slip clutch;

said slip clutch being made of a material such that it can freely rotate in said tube when said slip clutch is engaged with a respective one of said stop nuts and frictionally engage said tube when said slip clutch is between said stop nuts so that said slip clutch remains angularly fixed relative to said tube and said tube is moved linearly along said path when said threaded shaft is rotated.

13. The linear actuator of claim 12 wherein said slip clutch is made from a lubricous plastic material.

14. The linear actuator of claim 13 wherein said slip clutch is made from a polyacetal.

15. The linear actuator of claim 12 where said shaft is operatively connected to a motor to be rotated thereby, said motor driving said actuator.

16. The linear actuator of claim 12 wherein said camming surfaces of said slip clutch and said stop nuts define stops, the stops of said stop nut co-acting with a respective stop of said clutch to prevent linear movement of said clutch in a selected direction.

17. The linear actuator of claim 16 wherein when said slip clutch engages said stop nut, said stop nut rotates said slip clutch when said threaded shaft is rotated within said shoe such that said slip clutch rotates relative to said tube.

18. A linear actuator including a hollow drive tube;

a slip clutch housed in said tube for rotation about an longitudinal axis, said slip clutch being axially fixed in said tube, said slip clutch being internally threaded and having a first face and a second face, each said face having a camming surface defining a stop, said slip clutch having a substantially uninterrupted outer surface which operatively frictionally engages a substantially uninterrupted inner surface of said hollow drive tube;

a threaded shaft threadably received in said slip clutch, said shaft being connectable to a motor to be rotated thereby, said slip clutch being rotationally fixed relative to said tube such that said slip clutch and hence said tube move linearly when said shaft is rotated; and first and second stop nuts, each said stop nut having a camming surface defining a stop, said stop nuts being fixed to said shaft to rotate therewith, said first stop nut being fixed to said shaft on a first side of said slip clutch and said second stop nut being to said shaft on a second side of said slip clutch, said stop nuts being mounted to said shaft such that their respective camming surfaces face the camming surfaces of said slip clutch, the distance between said stop nuts defining the length of a path of travel of said shaft in said tube;

said stop nut stops interacting with respective slip clutch stops when said slip clutch reaches an end of said travel path to prevent continued linear travel of said tube.

19. The linear actuator of claim 18 wherein said stop nut stops rotation of said slip clutch relative to said tube when said slip clutch is at an end of said path.

20. The linear actuator of claim 19 wherein said slip clutch is made of a material which will operatively frictionally engage said tube when said slip clutch is positioned between said stop nuts such that said slip clutch will not rotate within said tube and said tube will move linearly when said threaded shaft is rotated, but will rotate with respect to said tube when said slip clutch is engaged with one of said stop nuts.

21. An actuator comprising:

a drive tube having an axial opening in it;

a threaded shaft insertable in said axial opening;

first and second stop nuts, each of said stop nuts being fixed to said shaft for at least partial rotation therewith, said stop nuts being spaced from one another along said shaft, each of said stop nuts having opposed surfaces defining a camming face; and a clutch assembly received within said drive tube and mounted to said shaft intermediate said stop nuts, said clutch assembly including a clutch member having outboard faces defining camming surfaces for engagement at opposite ends of travel with respective faces of said stop nut, and means for frictionally engaging said clutch member to prevent rotation of said clutch member with respect to said drive tube when said clutch member is out of engagement with said stop nuts; and means for rotating said shaft, said clutch member being frictionally engaged with said engaging means and being constructed from a material different therefrom such that said clutch member remains rotationally fixed relative to said drive tube when said clutch member is out of engagement with said stop nuts, and such that engagement of the camming faces caused by rotation of said shaft overcomes the frictional force between said clutch member and said engaging means to rotate said clutch member within said tube when said camming faces engage.

* * * * *

UNITED STATES PATENT AND TRADEMARK OFFICE
CERTIFICATE OF CORRECTION

PATENT NO.   : 5,461,935
DATED        : October 31, 1995
INVENTOR(S)  : Hill

It is certified that error appears in the above-indentified patent and that said Letters Patent is hereby corrected as shown below:

Column 5, Line 28, delete "robe" and insert therefor --tube--;

Signed and Sealed this

Third Day of February, 1998

Attest:

BRUCE LEHMAN

Attesting Officer     Commissioner of Patents and Trademarks